United States Patent
Yang et al.

(10) Patent No.: US 9,954,401 B2
(45) Date of Patent: Apr. 24, 2018

(54) METHOD AND APPARATUS FOR WIRELESS POWER TRANSMISSION

(71) Applicant: Electronics and Telecommunications Research Institute, Daejeon (KR)

(72) Inventors: Hoe-Sung Yang, Daejeon (KR); Kang Bok Lee, Daejeon (KR); Sang Yeoun Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 233 days.

(21) Appl. No.: 15/086,320

(22) Filed: Mar. 31, 2016

(65) Prior Publication Data
US 2016/0329749 A1    Nov. 10, 2016

(30) Foreign Application Priority Data
May 4, 2015  (KR) .................. 10-2015-0062740

(51) Int. Cl.
| | | |
|---|---|---|
| *B60L 1/00* | (2006.01) | |
| *B60L 3/00* | (2006.01) | |
| *H02G 3/00* | (2006.01) | |
| *H02J 50/12* | (2016.01) | |
| *B60C 23/04* | (2006.01) | |

(52) U.S. Cl.
CPC ............ *H02J 50/12* (2016.02); *B60C 23/041* (2013.01); *B60C 23/0413* (2013.01)

(58) Field of Classification Search
USPC ................................ 307/9.1, 10.1
See application file for complete search history.

(56) References Cited

U.S. PATENT DOCUMENTS

| | | | | |
|---|---|---|---|---|
| 6,474,832 B2* | 11/2002 | Murray | .................. | B60Q 1/326 362/192 |
| 7,994,905 B2* | 8/2011 | Kukshya | ............. | B60C 23/0408 340/445 |
| 8,482,395 B2* | 7/2013 | Rysenga | ............. | B60C 23/0472 340/442 |
| 8,742,912 B2* | 6/2014 | Blanchard | ............. | B60C 23/041 340/442 |
| 8,756,427 B2* | 6/2014 | Shah | ..................... | G06F 21/725 713/168 |
| 8,996,222 B1* | 3/2015 | Penrod | .................... | B60L 11/02 123/242 |

(Continued)

FOREIGN PATENT DOCUMENTS

| | | |
|---|---|---|
| JP | 2008100669 A | 5/2008 |
| KR | 1020070121494 A | 12/2007 |

(Continued)

*Primary Examiner* — Adam Houston
(74) *Attorney, Agent, or Firm* — William Park & Associates Ltd.

(57) ABSTRACT

A wireless power transmitting apparatus converts rotational energy of an axle to electrical energy, transfers the electrical energy to a transmitting coil of the wireless power transmitting apparatus through a power transfer connection pin that connects the inside of the wheel and the outside of the wheel of a vehicle, and wirelessly transmits the electrical energy to the sensor using resonance between a transmitting coil of the wireless power transmitting apparatus and a receiving coil of the sensor in order to use it as a driving power source of a sensor that detects a state of a tire.

7 Claims, 5 Drawing Sheets

(56) References Cited

U.S. PATENT DOCUMENTS

| | | | |
|---|---|---|---|
| 9,174,500 B2 * | 11/2015 | Won | B60C 23/0498 |
| 9,493,043 B2 * | 11/2016 | Yu | B60C 23/0461 |
| 9,694,712 B2 * | 7/2017 | Healy | B60L 15/2045 |
| 9,764,606 B2 * | 9/2017 | Makin | B60C 23/0469 |
| 9,827,816 B2 * | 11/2017 | Abughaida | B60C 23/20 |
| 2007/0295070 A1 | 12/2007 | Huang et al. | |
| 2008/0140278 A1 * | 6/2008 | Breed | G06F 8/65 |
| | | | 701/31.4 |
| 2009/0167503 A1 * | 7/2009 | Cook | G01L 9/0025 |
| | | | 340/10.41 |
| 2010/0141087 A1 * | 6/2010 | Bostan | G01N 29/245 |
| | | | 310/313 D |
| 2010/0308987 A1 * | 12/2010 | Haas | B60C 23/041 |
| | | | 340/447 |
| 2011/0248846 A1 * | 10/2011 | Belov | H04Q 9/00 |
| | | | 340/539.1 |
| 2012/0255349 A1 * | 10/2012 | Pop | B60C 23/0413 |
| | | | 73/146.5 |
| 2012/0296567 A1 * | 11/2012 | Breed | G01C 21/26 |
| | | | 701/468 |
| 2014/0203655 A1 | 7/2014 | Kim et al. | |
| 2014/0217831 A1 | 8/2014 | Hyoung et al. | |
| 2015/0251502 A1 * | 9/2015 | Brushaber | B60C 23/002 |
| | | | 152/418 |
| 2015/0377741 A1 * | 12/2015 | Stein | G01M 17/02 |
| | | | 307/9.1 |
| 2016/0159469 A1 * | 6/2016 | Vana | B60C 23/0408 |
| | | | 244/103 R |
| 2016/0176249 A1 * | 6/2016 | Brushaber | B60C 23/003 |
| | | | 73/146 |
| 2016/0268851 A1 * | 9/2016 | Pang | H02J 50/20 |
| 2016/0329749 A1 * | 11/2016 | Yang | H02J 50/12 |
| 2017/0144496 A1 * | 5/2017 | Dudar | B60C 23/0408 |
| 2017/0310345 A1 * | 10/2017 | Kitayoshi | H04B 1/04 |

FOREIGN PATENT DOCUMENTS

| | | |
|---|---|---|
| KR | 1020080008730 A | 1/2008 |
| KR | 1020080009974 A | 1/2008 |
| KR | 1020120003747 A | 1/2012 |
| KR | 1020120117262 A | 10/2012 |

* cited by examiner

METHOD AND APPARATUS FOR WIRELESS POWER TRANSMISSION

CROSS-REFERENCE TO RELATED APPLICATION

This application claims priority to and the benefit of Korean Patent Application No. 10-2015-0062740 filed in the Korean Intellectual Property Office on May 4, 2015, the entire contents of which are incorporated herein by reference.

BACKGROUND OF THE INVENTION (a) Field of the Invention

The present invention relates to a method and apparatus for transmitting power wirelessly. More particularly, the present invention relates to a method and apparatus for transmitting power wirelessly that is necessary for operation of a sensor that is located at the inside and the outside of a vehicle tire.

(b) Description of the Related Art

As in a conventional tire pressure monitoring system (TPMS), a sensor that senses a pressure or a temperature of a vehicle tire requires a power source for operation.

In general, such a sensor supplies power using a small coin-type battery, thereby performing a sensing operation. Further, sensed information is transmitted to a vehicle management system using a wireless communication transmitting function of the sensor, and thus a driver may determine whether a problem occurs.

However, a sensor use time is limited according to a limitation of battery capacity and a transmitting cycle, and when a battery is exhausted, there is a problem that sensor operation and a vehicle state cannot be determined.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method and apparatus for wireless power transmission having advantages of being capable of overcoming a limited power supply problem of a battery.

An exemplary embodiment of the present invention provides a wireless power transmitting apparatus between a wheel and a tire of a vehicle. The wireless power transmitting apparatus includes: an electric generator that converts rotational energy of an axle to electrical energy; and a wireless transmitting unit that wirelessly transmits the electrical energy to the sensor in order to use it as a driving power source of a sensor that detects a state of the tire, wherein the electric generator includes a power transfer connection pin that connects the inside of the wheel and the outside of the wheel and that transfers the electrical energy to the wireless transmitting unit.

The wireless transmitting unit may include a transmitting coil that contacts a rim of the wheel and a space of the tire and wirelessly transmit the electrical energy to the sensor using resonance between the transmitting coil and a receiving coil of the sensor, and the power transfer connection pin may transfer the electrical energy to the transmitting coil.

The electric generator may further include: a magnetic material that is located at the axle; and a power generation coil that is located at the outside of the wheel, wherein the power transfer connection pin may be connected between the power generation coil and the transmitting coil.

The power transfer connection pin may be insulated from the wheel.

Another embodiment of the present invention provides a method of wireless power transmission between a wheel and a tire of a vehicle in a wireless power transmitting apparatus. The method includes: converting rotational energy of an axle to electrical energy; transferring the electrical energy to a transmitting coil of the wireless power transmitting apparatus through a power transfer connection pin that connects the inside of the wheel and the outside of the wheel; and wirelessly transmitting the electrical energy to the sensor using resonance between a transmitting coil of the wireless power transmitting apparatus and a receiving coil of the sensor in order to use it as a driving power source of a sensor that detects a state of the tire.

The converting of rotational energy may include generating, by a magnetic material that is located at the axle and a power generation coil that is located at the outside of the wheel, the electrical energy by a rotating axle.

The transmitting coil may contact a rim of the wheel and a space of the tire, and the power transfer connection pin may be connected between the power generation coil and the transmitting coil.

DETAILED DESCRIPTION OF THE EMBODIMENTS

Figure 1:
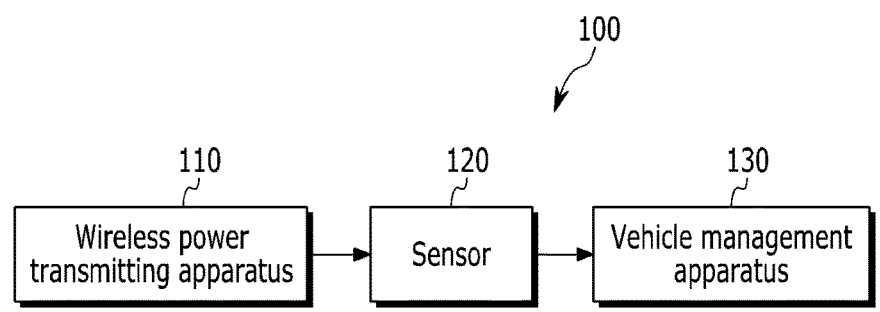
FIG. 1 is a block diagram illustrating a configuration of a vehicle management system to which a wireless power transmitting apparatus is applied according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, in the entire specification and claims, unless explicitly described to the contrary, the word "comprise" and variations such as "comprises" or "comprising" will be understood to imply the inclusion of stated elements but not the exclusion of any other elements.

Hereinafter, a method and apparatus for wireless power transmission according to an exemplary embodiment of the present invention will be described in detail with reference to the drawings.

Figure 2:
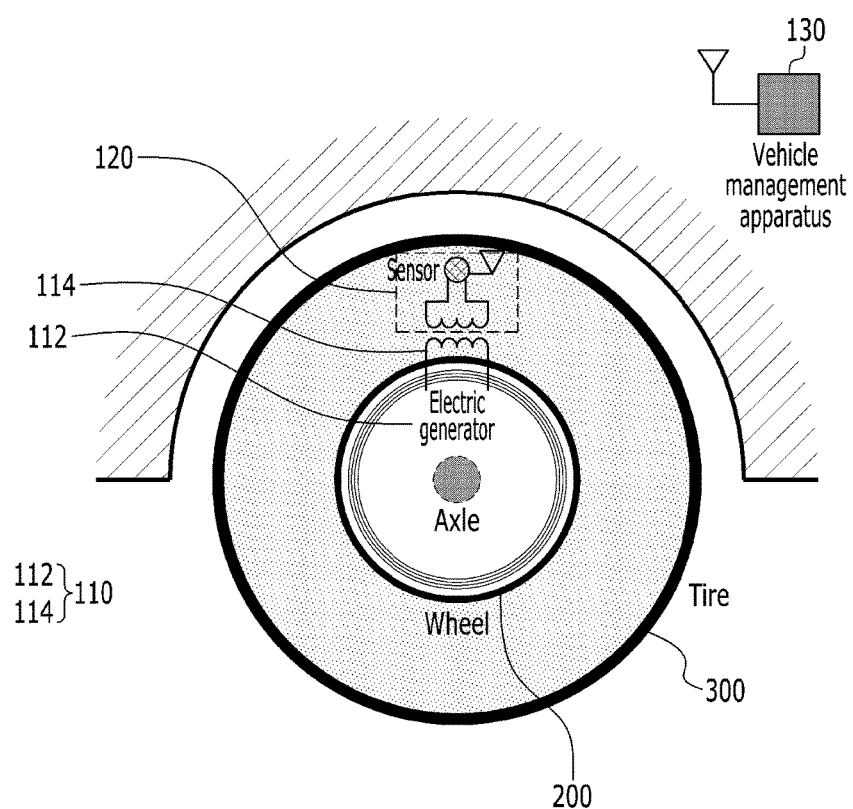
FIG. 2 is a diagram illustrating an example of a wireless power transmitting apparatus between a wheel and a tire according to an exemplary embodiment of the present invention.

FIG. 1 is a block diagram illustrating a configuration of a vehicle management system to which a wireless power transmitting apparatus is applied according to an exemplary embodiment of the present invention, and FIG. 2 is a diagram illustrating an example of a wireless power transmitting apparatus between a wheel and a tire according to an exemplary embodiment of the present invention.

Referring to FIG. 1, a vehicle management system 100 includes a wireless power transmitting apparatus 110, a sensor 120, and a vehicle management apparatus 130.

As shown in FIG. 2, a vehicle includes a wheel 200 and a tire 300. The tire 300 is inserted into the wheel 200 to integrally rotate.

The wireless power transmitting apparatus 110 wirelessly transmits power between the wheel 200 and the tire 300. The wireless power transmitting apparatus 110 includes an electric generator 112 and a wireless transmitting unit 114.

The electric generator 112 converts rotational energy of an axle to electrical energy. In order to use electrical energy that is generated in the electric generator 112 as a power source for driving and communication of the sensor 120, the wireless transmitting unit 114 wirelessly transmits the electrical energy to the sensor 120.

The sensor 120 is located at the inside and/or the outside of the tire 300, uses electrical energy that is transmitted from the wireless power transmitting apparatus 110 as driving power, detects and measures a state of the inside and the outside of the tire 300, and wirelessly transmits measurement information to the vehicle management apparatus 130.

The vehicle management apparatus 130 collects and manages measurement information from the sensor 120, manages a state of the tire 300 of the vehicle based on the measurement information, and acquires road surface information of a road.

Figure 3:
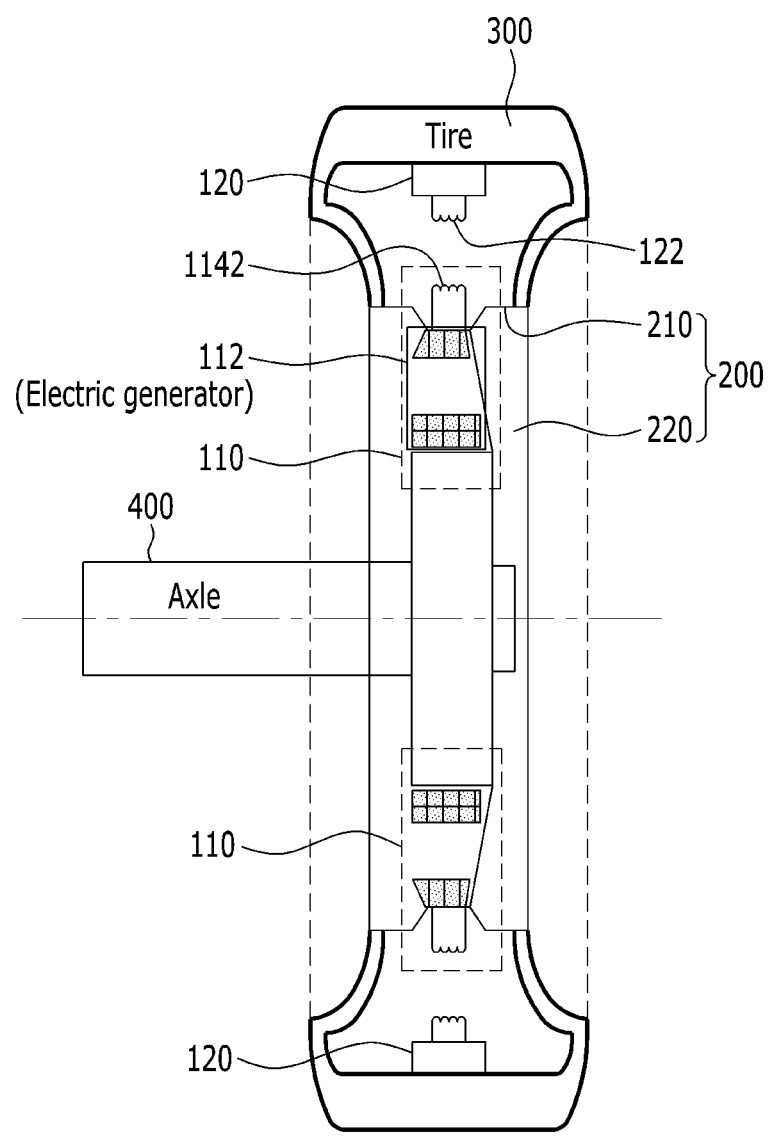
FIG. 3 is a diagram illustrating the wireless power transmitting apparatus of FIGS. 1 and 2.

FIG. 3 is a diagram illustrating the wireless power transmitting apparatus of FIGS. 1 and 2.

Referring to FIG. 3, the wheel 200 of the vehicle is coupled to the axle to rotate.

The wheel 200 includes a disc 220 for mounting a rim 210 and the wheel 200 that support the tire 300 in a hub 400 of the axle. The rim 210 forms an outer wheel of the wheel 200 and is a cylindrical circumferential edge portion to which the tire 300 is coupled, and the tire 300 is inserted into a circumference thereof. The disk 220 is coupled to an interior circumference of the rim 210 to be mounted in the hub 400 of the vehicle.

When the tire 300 is inserted into the rim 210 of the wheel 200, a space is formed between the tire 300 and the rim 210. The sensor 120 may be installed to contact the tire 300 in the space. The wireless transmitting unit 114 of the wireless power transmitting apparatus 110 may be installed to contact the rim 210 in the space. The wireless transmitting unit 114 wirelessly transmits electrical energy that is generated in the electric generator 112 to the sensor 120. In order to wirelessly transmit the energy, the wireless transmitting unit 114 may include a transmitting coil 1142. In this case, in order to receive electrical energy by wireless power transmission, the sensor 120 may include a receiving coil 122. By resonating with the transmitting coil 1142, the receiving coil 122 may wirelessly receive electrical energy.

The electric generator 112 of the wireless power transmitting apparatus 110 converts rotational energy of the axle to electrical energy, and may be installed in the wheel 200.

Figure 4:
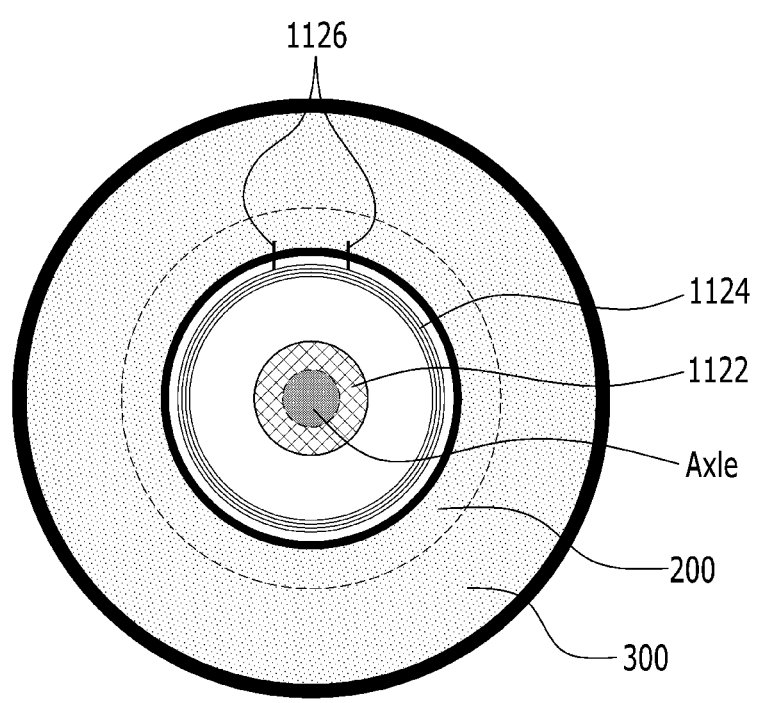
FIG. 4 is a diagram illustrating an example of an electric generator of FIGS. 1 and 2.

FIG. 4 is a diagram illustrating an example of an electric generator of FIGS. 1 and 2.

Referring to FIG. 4, the electric generator 112 includes a magnetic material 1122, a power generation coil 1124, and a power transfer connection pin 1126.

The magnetic material 1122 is located at an axle.

The power generation coil 1124 is located at the outside of the wheel 200. For example, the power generation coil 1124 may be wound a predetermined number of times along a circumference of the disk 220 at the outside of the disk 220. That is, the power generation coil 1124 encloses a periphery of the magnetic material 1122. As the axle rotates, the magnetic material 1122 that is located at the axle generates power through interaction with the power generation coil 1124.

The power transfer connection pin 1126 connects the inside and the outside of the wheel 200 and is insulated from the wheel 200. The power transfer connection pin 1126 is connected between the power generation coil 1124 and the transmitting coil 1142 of the wireless transmitting unit 114, and transfers power that is generated by the power generation coil 1124 and the magnet 1122 at the outside of the wheel 200 to the transmitting coil 1142 of the wireless transmitting unit 114 at the outside of the rim 210, i.e., at the inside of the tire 300.

Figure 5:
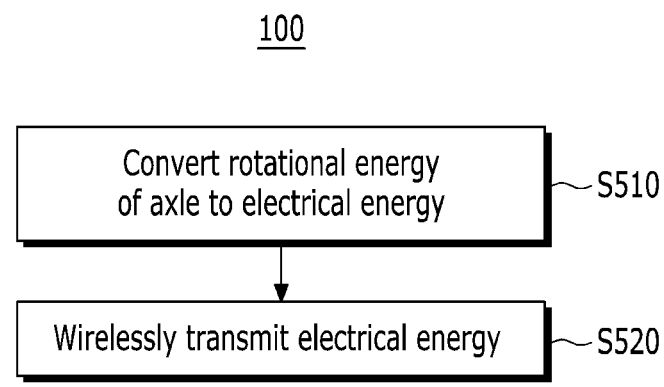
FIG. 5 is a flowchart illustrating a method of wireless power transmission according to an exemplary embodiment of the present invention.

FIG. 5 is a flowchart illustrating a method of wirelessly transmitting power according to an exemplary embodiment of the present invention.

Referring to FIG. 5, the wireless power transmitting apparatus 110 converts rotational energy of the axle to electrical energy (S510), as described with reference to FIG. 4. That is, as a vehicle drives, the axle rotates, and while the axle rotates, electrical energy is generated by the magnetic material 1122 and the power generation coil 1124.

The wireless power transmitting apparatus 110 wirelessly transmits electrical energy to the sensor 120 (S520). By using electrical energy from the wireless power transmitting apparatus 110 as a driving power source, the sensor 120 detects a tire state and transmits state information to the vehicle management apparatus 130.

In this way, when the vehicle drives, by converting rotational energy thereof to electrical energy and by supplying the electrical energy to the sensor 120, a problem of limited power supply of a battery can be solved.

According to an exemplary embodiment of the present invention, by wireless power transmission of energy that is generated in a vehicle axle to the inside and the outside of a tire and by using the electrical energy as a driving power source of a sensor that is located at the inside and the outside of the tire, a limitation of power supply of a battery can be overcome with efficiency from an energy reuse viewpoint.

An exemplary embodiment of the present invention may not only be embodied through the above-described apparatus and/or method, but may also be embodied through a program that executes a function corresponding to a configuration of the exemplary embodiment of the present invention or through a recording medium on which the program is recorded, and can be easily embodied by a person of ordinary skill in the art from a description of the foregoing exemplary embodiment.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A wireless power transmitting apparatus between a wheel and a tire of a vehicle, the wireless power transmitting apparatus comprising:
   an electric generatorelectric generator that converts rotational energy of an axle to electrical energy; and
   a wireless transmitting unit that wirelessly transmits the electrical energy to the sensor in order to use it as a driving power source of a sensor that detects a state of the tire,
   wherein the electric generator comprises a power transfer connection pin that connects the inside of the wheel and the outside of the wheel and that transfers the electrical energy to the wireless transmitting unit.

2. The wireless power transmitting apparatus of claim 1, wherein the wireless transmitting unit comprises a transmitting coil that contacts a rim of the wheel and a space of the tire and wirelessly the electrical energy to the sensor using resonance between the transmitting coil and a receiving coil of the sensor, and
   the power transfer connection pin transfers the electrical energy to the transmitting coil.

3. The wireless power transmitting apparatus of claim 2, wherein the electric generator further comprises:
   a magnetic material that is located at the axle; and
   a power generation coil that is located at the outside of the wheel,
   wherein the power transfer connection pin is connected between the power generation coil and the transmitting coil.

4. The wireless power transmitting apparatus of claim 1, wherein the power transfer connection pin is insulated from the wheel.

5. A method of wirelessly transmitting power between a wheel and a tire of a vehicle in a wireless power transmitting apparatus, the method comprising:
   converting rotational energy of an axle to electrical energy;
   transferring the electrical energy to a transmitting coil of the wireless power transmitting apparatus through a power transfer connection pin that connects the inside of the wheel and the outside of the wheel; and
   wirelessly transmitting the electrical energy to the sensor using resonance between a transmitting coil of the wireless power transmitting apparatus and a receiving coil of the sensor in order to use it as a driving power source of a sensor that detects a state of the tire.

6. The method of claim 4, wherein the converting of rotational energy comprises generating, by a magnetic material that is located at the axle and a power generation coil that is located at the outside of the wheel, the electrical energy by the rotating axle.

7. The method of claim 5, wherein the transmitting coil contacts a rim of the wheel and a space of the tire, and
   the power transfer connection pin is connected between the power generation coil and the transmitting coil.

* * * * *